M. A. MARTIN.
INDICATOR FOR VEHICLES.
APPLICATION FILED MAR. 8, 1909. RENEWED APR. 20, 1910.

979,526.

Patented Dec. 27, 1910.

2 SHEETS—SHEET 1.

Witnesses:
N. H. Griffin
A. A. Olson

Inventor:
Margaret A. Martin
by J. H. Potts
her Attorney.

UNITED STATES PATENT OFFICE.

MARGARET A. MARTIN, OF CHICAGO, ILLINOIS, ASSIGNOR OF ONE-FOURTH TO EDWIN WAPPLER, OF CHICAGO, ILLINOIS.

INDICATOR FOR VEHICLES.

979,526.  Specification of Letters Patent.  Patented Dec. 27, 1910.

Application filed March 8, 1909, Serial No. 482,108. Renewed April 20, 1910. Serial No. 556,620.

*To all whom it may concern:*

Be it known that I, MARGARET A. MARTIN, a citizen of the United States, residing at Chicago, county of Cook, and State of Illinois, have invented certain new and useful Improvements in Indicators for Vehicles, of which the following is a specification.

My invention relates to illuminated indicators for vehicles, that is to devices designed for displaying the registration or license number of a vehicle.

The object of my invention is to provide a transparency of the character mentioned adapted to show by day and also adapted to be illuminated to distinctly display at night the license number and also indicate the State in which the number is registered of the owner of the vehicle to which the device is attached.

A further object of my invention is to provide a transparency which will be adapted to display not only the vehicle license number and to indicate the State of the registration thereof, but which will also be adapted to serve in the capacity of a rear signal light and also side signal lights for the vehicle; it being as is known a requirement of the law, at the present time, that vehicles such as automobiles be equipped for safety with such lights.

A further object is to provide a device of the nature stated which will be of the highest possible efficiency though comparatively simple of construction. Other objects will appear hereinafter.

With these objects in view my invention consists in a transparency characterized as above mentioned and in certain details of construction and arrangement of parts all as will be hereinafter fully described and particularly pointed out in the claims.

Figure 1:
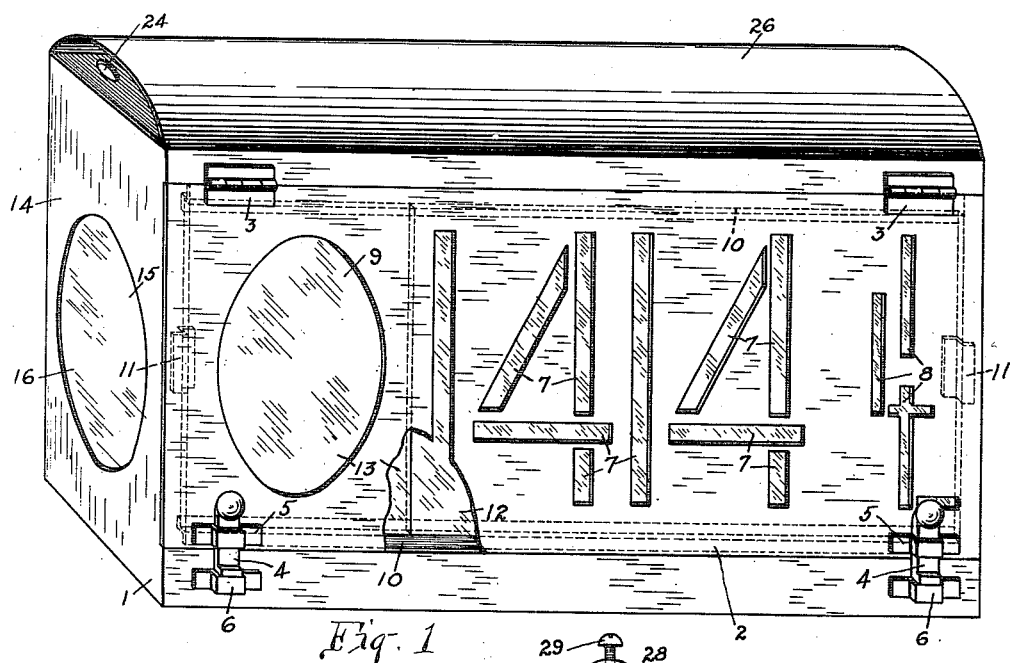
Figures 2, 3:
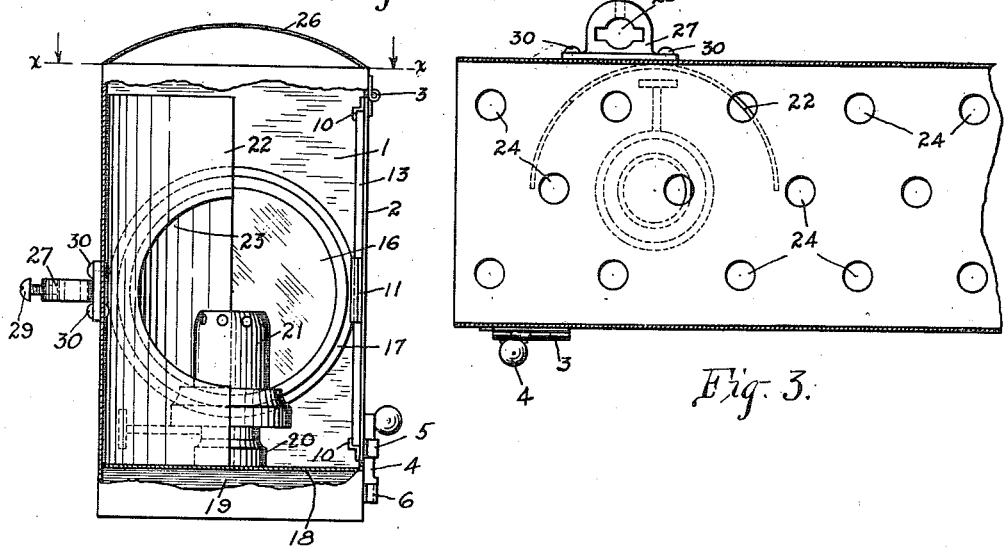
Figure 4:
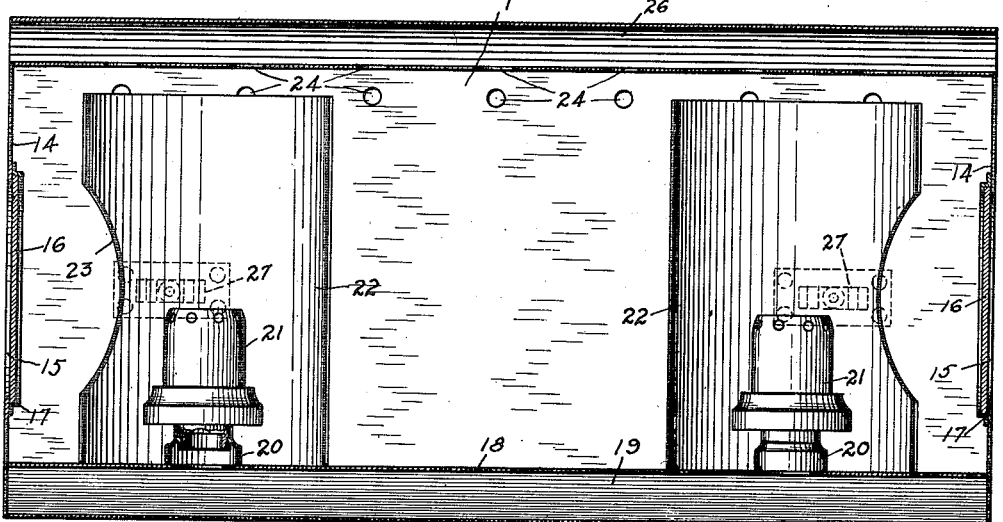
Figure 5:
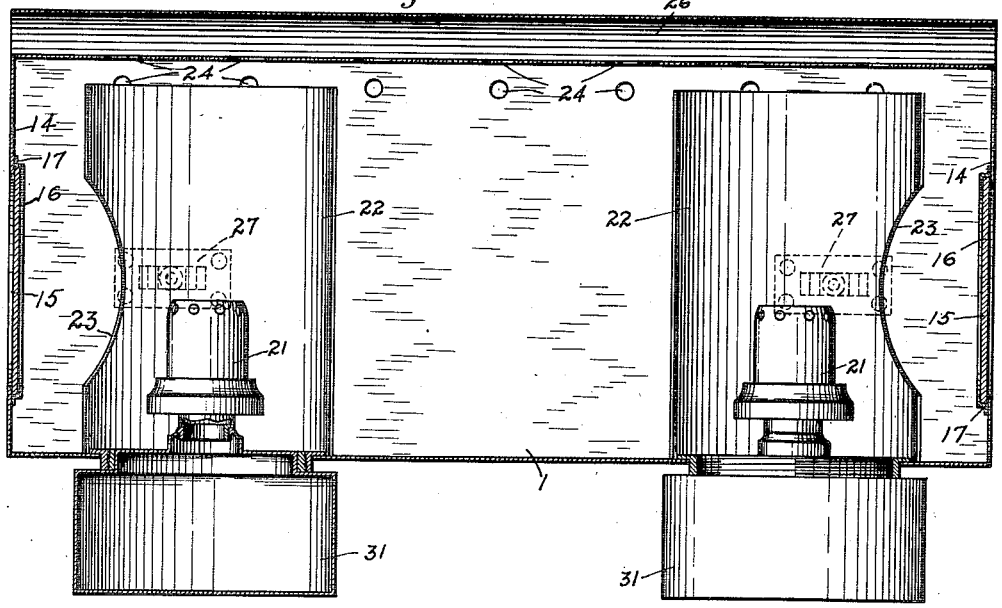

My invention will be more readily understood by reference to the accompanying drawings forming a part of this specification, and in which, Figure 1 is a perspective view of the preferred form of my device, a portion of the door thereof being broken away so as to better illustrate its construction, Fig. 2 is an end elevation thereof, the end wall being broken away to expose rearwardly lying parts, Fig. 3 is a horizontal section of an end portion of the device, taken on the line $x\ x$ of Fig. 2, Fig. 4 is a central vertical longitudinal section thereof, and Fig. 5 is a similar section of a slightly modified form of my device.

Referring now to the drawings 1 indicates the preferably elongated rectangularly formed body of my indicator, the front side of which is open, said body being formed of any suitable sheet metal. Arranged upon the body 1, the same being adapted to close the front side of said body, is a door 2 hung upon hinges 3. Provided at the lower edge of the door 2, the same being preferably positioned one at either extremity thereof, are bolts 4 vertically slidable in loops 5 preferably soldered to said door. The lower extremities of said bolts are adapted to be received in loops 6 provided for the reception of the same close to the base of the body 1. Formed in the door 2 are openings 7, 8 and 9, the openings 7 representing numbers corresponding to the license number of the vehicle upon which the device is used, the openings 8 provided preferably at the right end portion thereof representing letters indicating the name of the State in which the license is registered. The opening 9 provided at the opposite end portion of said door is relatively large in dimensions and is preferably circular in shape. Arranged upon the inside surface of said door, the same being secured thereto in any suitable manner, but preferably by means of elongated flanges 10 engaging the upper and lower edges thereof, and shorter similar flanges 11 engaging the lateral extremities thereof, is a translucent plate 12 preferably of ground glass and contiguous thereto and in alinement therewith a colored translucent or transparent plate 13 preferably of red or green colored glass, the former of said plates being arranged rearwardly of the openings 7 and 8, and the latter thereof rearwardly of the opening 9. By such provision, when the device is in use, the latter opening may serve in the capacity of a rear light for the vehicle.

Each of the end walls 14 of the body 1 is provided with a circular opening 15 rearwardly of which is arranged a colored translucent or transparent plate 16 preferably of red or green colored glass, the same being secured in position by means of a flange 17 secured preferably by soldering to the inner surface of the wall 14, the same engaging the edges of said glass. Such openings are adapted, when the device is in use, to adapt the latter to act in the capacity of side lights for the vehicle.

Formed in the bottom of the body 1, by means of a horizontally disposed longitudinally extending partition or false bottom 18, is a fuel reservoir 19. Communicating with said reservoir, the same being preferably in threaded connection with tubular seats 20 provided upon the portion 18 for the support thereof, are burners 21 of any ordinary or preferred construction. Arranged rearwardly of the burners 21, the same being fixed to the upper surface of the portion 18 are curved reflector plates 22, the outward edge portion of either of which is cut away as at 23 so as to permit of the passage of light rays emitted from the burners to the openings 15. Ventilating holes 24 are provided in the top and the upper portion of the rear wall of the body 21, those provided in the top wall being covered by an arched protecting plate or shield 26 the longitudinal edges of which are secured preferably by soldering to the upper longitudinally extending edges of the body 1.

Lugs 27, each being provided with a slot 28 and a set-screw 29, the same being secured to the rear wall of the body 1, one at either extremity thereof by means preferably of rivets 30, afford means of securing the indicator upon a vehicle. The slots 28 provided in said lugs are preferably of a shape as shown so as to adapt the same to receive brackets of either the round or the flat type.

The modification in the form shown in Fig. 5 lies wholly in the fuel reservoirs of the burners thereof. In said form instead of a reservoir 19 common to both the burners 21, as in my preferred form, each of the burners 21 is provided with an individual reservoir 31. Said reservoirs are in threaded connection with the bottom of the indicator body, hence their detachment may readily be effected to facilitate the cleaning thereof.

While I have shown what I deem to be the preferable form of my device, I do not wish to be limited thereto, as there might be many changes made in the details of construction and arrangement of parts without departing from the spirit of my invention comprehended within the appended claims.

Having described my invention what I claim as new and desire to secure by Letters Patent is:

1. In an indicator of the class described, the combination of a body; two burners within the body; a front wall for said body having openings indicative of the license number of a vehicle; a danger signal opening in said front wall adjacent the aforesaid openings; translucent plates mounted behind said openings; end walls for said body having danger signal openings; translucent plates behind said last mentioned openings; and substantially semi-cylindrical reflectors behind said burners, having openings in their sides behind said openings in said end walls, substantially as described.

2. In an indicator of the class described, the combination of a body; a hinged door having license number openings and a circular signal opening therein; top, bottom and side flanges on the inside of said door; ground and colored glass plates secured in said flanges; end walls having circular openings therein; flanges on the insides of said end walls; glass plates secured in said end wall flanges; burners in the body; and semi-cylindrical reflectors having openings in their sides and mounted behind said burners, substantially as described.

In testimony whereof I have signed my name to this specification in the presence of two subscribing witnesses.

MARGARET A. MARTIN.

Witnesses:
JOSHUA R. H. POTTS,
HELEN F. LILLIS.